United States Patent [19]

Takada

[11] 4,401,281
[45] Aug. 30, 1983

[54] BELT CLAMPS FOR VEHICLE OCCUPANT RESTRAINT BELT SYSTEMS

[76] Inventor: Juichiro Takada, 3-12-1, Shinmachi Setagayaku, Tokyo, Japan

[21] Appl. No.: 275,364

[22] Filed: Jun. 19, 1981

[30] Foreign Application Priority Data

Jul. 3, 1980 [JP] Japan ............................. 55-9292[U]
Sep. 24, 1980 [JP] Japan ........................... 55-134793[U]
Nov. 19, 1980 [JP] Japan ........................... 55-164812[U]

[51] Int. Cl.³ .................... A62B 35/02; B65H 75/48
[52] U.S. Cl. ..................................... 242/107.2
[58] Field of Search ............... 242/107.2, 107.4 R, 242/107.4 E; 280/803, 806–808; 297/476–480; 188/65.1

[56] References Cited

U.S. PATENT DOCUMENTS 3,817,473  6/1974  Board et al. ............... 242/107.2
4,319,667  3/1982  Motonami et al. ......... 242/107.2 X
4,323,204  4/1982  Takada ...................... 242/107.2

Primary Examiner—John M. Jillions
Attorney, Agent, or Firm—Brumbaugh, Graves, Donohue & Raymond

[57] ABSTRACT

A belt clamp for use in conjunction with an emergency locking retractor in a vehicle occupant restraint belt system comprises a belt turning roll having the belt looped around it and carried by a pair of spaced-apart levers, one on either side of the frame, that are substantially rigidly joined together and mounted on the frame for rotation about an axis transverse to the frame. Springs normally hold the turning roll and levers away from a movable clamping jaw that is supported by the frame to move toward and away from a matching fixed clamping jaw. The springs yield to a substanial pull out force on the belt, thereby enabling the lever and turning roll to pivot toward and to engage and shift the movable clamping jaw toward the fixed clamping jaw, whereupon the belt is gripped between gripping surfaces on the jaws and is prevented from pulling out from the emergency locking retractor.

12 Claims, 11 Drawing Figures

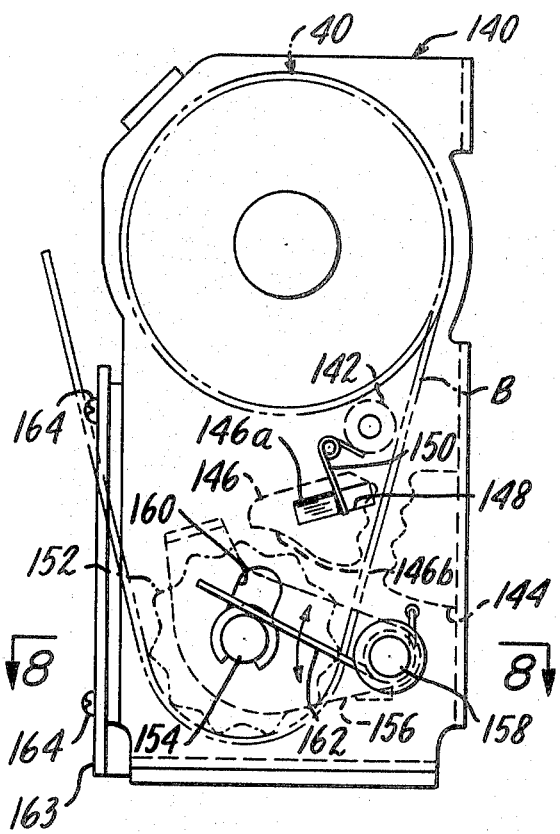
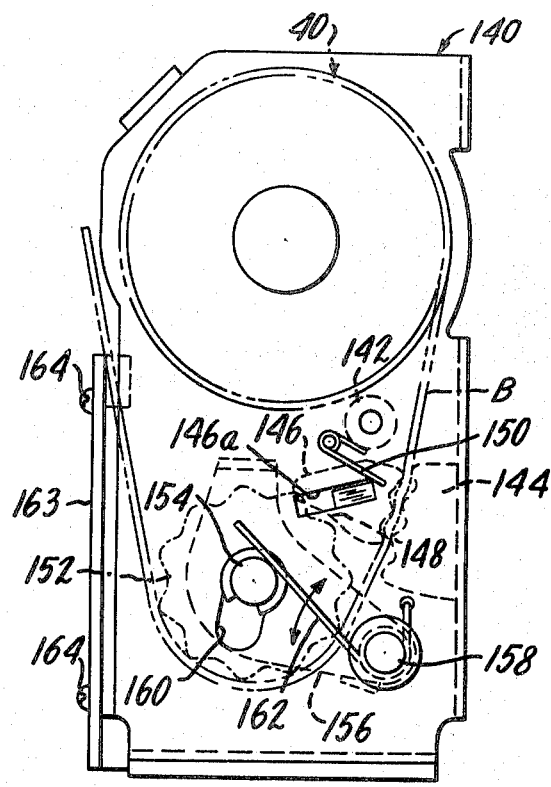
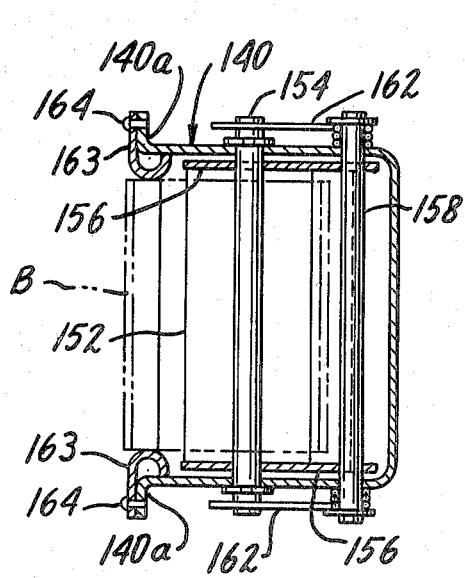
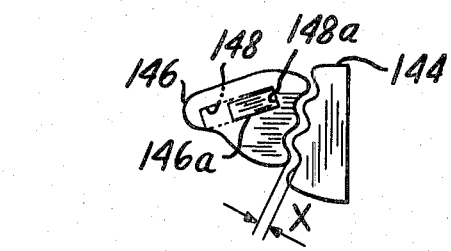
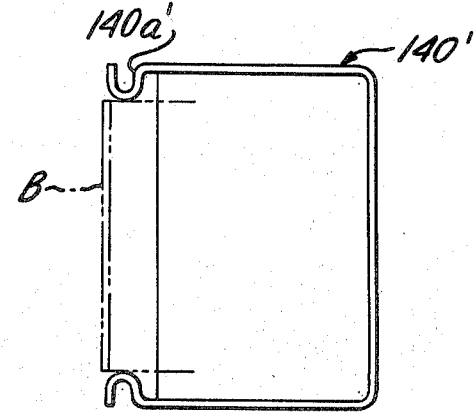

BELT CLAMPS FOR VEHICLE OCCUPANT RESTRAINT BELT SYSTEMS

FIELD OF THE INVENTION

The present invention relates to vehicle occupant restraint belt systems and, in particular, to belt clamps for use in conjunction with emergency locking retractors.

BACKGROUND OF THE INVENTION

During the past few years the occupant safety belt systems with which most vehicles have been equipped have employed emergency locking retractors, that is, retractors of the type that lock automatically in response to either abrupt acceleration of the belt in the unwinding direction or an abrupt acceleration of the vehicle, events that are most often associated with a vehicle collision. Emergency locking retractors have the advantage of allowing the user to lean forward in the vehicle rather than being strapped in with no opportunity for movement without undoing the belt. Moreover, they are, in general, easier to fasten up when the occupant enters the vehicle. They have been recognized as being entirely safe and effective. Some emergency locking retractors are constructed to respond to both acceleration of the belt and acceleration of the vehicle.

One problem with emergency locking retractors, and some other types of retractors as well, is that they permit a significant amount of elongation of the effective length of the belt in a collision due to the tightening of the several turns of the belt on the belt reel. Those turns or wraps of the belt that remain on the reel when it is fastened up are comparatively loose, and the very high forces imposed on the belt in a collision are sufficient to tighten those loops considerably, thereby allowing a length of the belt to withdraw from the belt reel even though the reel is locked against rotation by the emergency locking mechanism.

The inherent problem of emergency locking retractors of allowing some pull-out of the belt following locking of the retractor due to tightening of the loops that remain on the retractor is not particularly serious in the case of fixed belt systems, inasmuch as the number of turns of the belt that remain on the reel when the belt is fastened are comparatively small. On the other hand in some passive systems a significant number of turns remain on the belt when it is in the restraining configuration, those turns being required to enable the belt to be pulled out when it is transferred from the restraining to the releasing configuration. The greater number of comparatively loose turns of the belt on the reel increases the seriousness of the problem of belt elongation.

There have been various proposals for providing some sort of clamp in association with an emergency locking retractor to reduce or eliminate the release of a length of belt from the reel due to tightening of the remaining loops. Many of the proposals made in the past have been unsatisfactory either because they do not fully lock the belt but instead let it slip or they present the possibility of failure of the belt in the event of a very high pull-out force. There have also been belt clamps which seem adequate to withstand the pull-out force reasonably well without belt failure, but they have been difficult to release, an inconvenience for the occupant who has to release the belt by hand each time the device is activated.

The inventor of the present invention has heretofore invented the belt clamp shown in FIG. 1 of the accompanying drawings and described and shown more fully in U.S. patent application Ser. No. 107,161 filed Dec. 26, 1979 and entitled "Belt Clamps for Vehicle Passenger Restraint Belts" now U.S. Pat. No. 4,323,204. The belt clamp shown in FIG. 1 is intended to be used in conjunction with an emergency locking retractor, preferably by integrating the clamp in the same assembly and on the same U-shaped frame 10. The restraint belt B leads from the belt reel 12 of the retractor past a guide roll 14 and in between a fixed clamping jaw 16 strongly attached to the frame 10 and a movable clamp member 18 that normally falls by gravity into the position shown in solid lines in which it is spaced apart some distance from the fixed clamping jaw 16 so that the belt can run downward freely between the clamping jaws without touching either of them. The movable jaw 18 has a pair of laterally extending lugs 20, one extending laterally out at each end and each of which is received in an elongated guide hole 22. The belt B then turns part way around a corrugated turning roll 24 that is ordinarily held by springs 26 in a downward position. The force of the springs 26 is sufficient to keep the turning roll 24 in the downward position during normal unwinding and rewinding movements of the belt B but yields in the event of a relatively high pull-out force on the belt B, thereby moving upwardly to the position shown in phantom lines in FIG. 1 in which it engages the movable clamping jaw 18 and moves it into clamping engagement with the belt. The jaws have complementary corrugated clamping surfaces that provide a high frictional force that resists further pull-out of the belt B. The turning roll 24 is carried by a shaft 28, the ends of which extend outward into matching elongated holes 30 in the side members of the frame 10. The axes of the holes 30 establish a path of movement of the turning roll 24 that is generally aligned with the incoming segment of the belt B before it turns around the roll. The corrugated surface of the turning roll and the matching camming surface 18a of the movable clamping jaw provide for an increased transfer of forces in a direction transverse to the belt in response to the pull-out force on the belt, as compared to a plain cylindrical roll and a flat camming surface on the movable clamping jaw.

It will be understood by those skilled in the art that the emergency locking retractor 12 is shown schematically in FIG. 1. Such retractors have some sort of locking mechanism of either the belt pull-out sensitive or an inertia sensitive type, or both, as represented in FIG. 1 by a pendulum and pawl 32. A belt clamp constructed in accordance with the present invention can be used with any of a variety of types of emergency locking retractors.

Experiments conducted using belt clamps of a type shown in FIG. 1 have been successful in demonstrating the effectiveness of the use of a turning roll as a clamp actuating mechanism that, by camming action, urges a movable clamping jaw toward a fixed clamping jaw and causes the belt to be clamped between complementary corrugated clamping surfaces on the clamping jaws. Those experiments have, on the other hand, indicated a possible problem with the device shown in FIG. 1; if the belt is pulled off the turning roll 24 at an angle to one side or the other of a plane perpendicular to the axis of the shaft 28 of the turning roll, the forces transmitted from the turning roll to the movable clamping jaw are significantly higher at one side than they are at the other, thereby tending to produce an excessive clamping force on one side of the clamping jaws. The high force may be sufficient to initiate belt failure.

SUMMARY OF THE INVENTION

There is provided, in accordance with the present invention, an improved belt clamp that follows the general principles of the belt clamp shown in FIG. 1 but overcomes the possible problem of the tendency of the turning roll to cock in the event of the belt being pulled out in a direction oblique to a plane perpendicular to the normal axis of the turning roll. In particular, a belt clamp, in accordance with the present invention, comprises a generally U-shaped frame having a base and a pair of side members. Spaced-apart levers, one on either side of the frame, are substantially rigidly joined to each other and mounted on the frame for rotation about an axis transverse to the frame side members.

A belt turning roll having the belt looped around it such that the belt leads away from the roll in a direction generally opposed to the direction in which it leads to the roll is carried by the lever arms for rotation about an axis spaced apart from and parallel to the axis of rotation of the levers. The turning roll and the levers constitute a clamp-actuating structure. The side members of the frame have corresponding elongated guide holes that receive the respective end portions of the shaft. A fixed clamping jaw is affixed to the frame on side of and closely adjacent to the path of the belt as it leads toward the turning roll, and a movable clamping jaw is carried by the frame on the other side of the path of the belt for movement toward and away from the fixed clamping jaw. A spring normally urges the turning roll in a direction opposed to the pull-out direction of the belt from the turning roll. The turning roll, levers and clamping members are located on the frame such that upon locking of the retractor, and upon imposition of a pull-out force on the belt above a selected level, the clam-actuating structure translates into engagement with the movable clamping jaw and moves it toward the fixed clamping jaw, thereby to clamp the belt between the jaws against pulling out from the retractor.

The force of the belt actuating structure (i.e., the levers and the turning roll) may be transmitted to the movable clamping jaw either by engagement of the turning roll with a cam surface on the movable clamping jaw or by engagement between the levers and portions of the movable clamping jaw. Among some other variations in the belt clamp are the possibility of having the movable jaw held in a retracted position away from the belt by a spring or mounting it in the side frames in such a way that it falls to the inactive position by gravity. Advantageously, the movable jaw is mounted in the side members by means of laterally outwardly projecting lugs that extend into corresponding, elongated holes in the side members. The elongated guide holes in the side members can be of such a length and position that they are engaged by the lugs on the movable clamping jaw when the spacing between the movable clamping jaw and the fixed clamping jaw is just a little less than the thickness of the belt. In such an arrangement, the ends of the guide holes in the side frames constitute stops that limit the extent of movement of the movable jaw towards the fixed jaw and ensure against the imposition of an undesirably high clamping force imposed by the jaws on the belt. The levers are preferably joined together by a cross-piece, which may be an integral part of the lever, in which case the levers and cross piece constitutes a generally U-shaped element. It is desirable to provide guide surfaces on the side members of the frame located along the path of the belt as it leads from the turning roll and engageable with the edges of the belt to keep it tracking properly on the guide roll and prevent it from running off to either side of the turning roll.

For a better understanding of the invention, reference may be made to the following description of exemplary embodiments, taken in conjunction with the figures of the accompanying drawings.

DESCRIPTION OF THE DRAWINGS

FIG. 7 is a side elevational view of a fourth embodiment of the invention showing it in the retracted position.

FIG. 8 is a top cross-sectional view of the belt clamp of FIG. 7 taken generally along the lines 8—8 of FIG. 7 and in the direction of the arrows.

FIG. 9 is a side elevational view of the embodiment of FIGS. 7 and 8 showing it in the belt clamping position.

FIG. 10 is a detail view of the clamping jaws of an exemplary embodiment illustrating the use of the guide holes of the movable clamping element as stops for controlling the minimum gap between the gripping surfaces of the jaws.

FIG. 11 is a top view of a frame useful in any embodiment of the invention.

DESCRIPTION OF THE EXEMPLARY EMBODIMENTS

Figure 1:
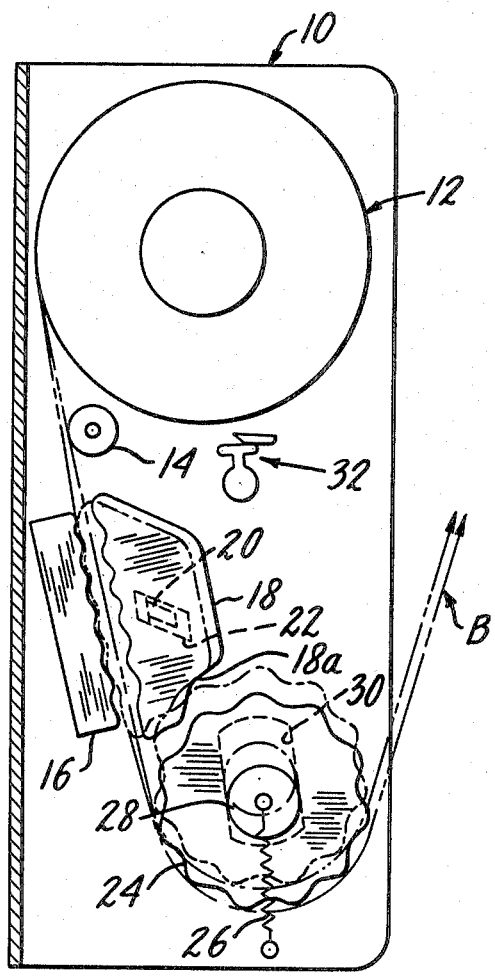
FIG. 1 is a side cross-sectional view of a retractor and belt clamp assembly over which the present invention is an improvement, the cross section being taken just inside of the near side member of the frame.

All of the embodiments of the present invention shown in the drawings involve a belt clamp that is integrated into a retractor and belt clamp assembly, but it will be understood by those skilled in the art that the belt clamp may be a separate assembly and that the retractor can be located at some other position in the vehicle with a run of belt extending from the retractor to the clamp. There are, however, obvious advantages to integrating the belt clamp with a retractor. In each of the embodiments shown in the drawings, the retractor is designated by the reference numeral 40 and, as mentioned above, may be of any of variety of types based on belt pull-out sensitive locking mechanisms, inertia-sensitive mechanism, or both.

Figure 2:
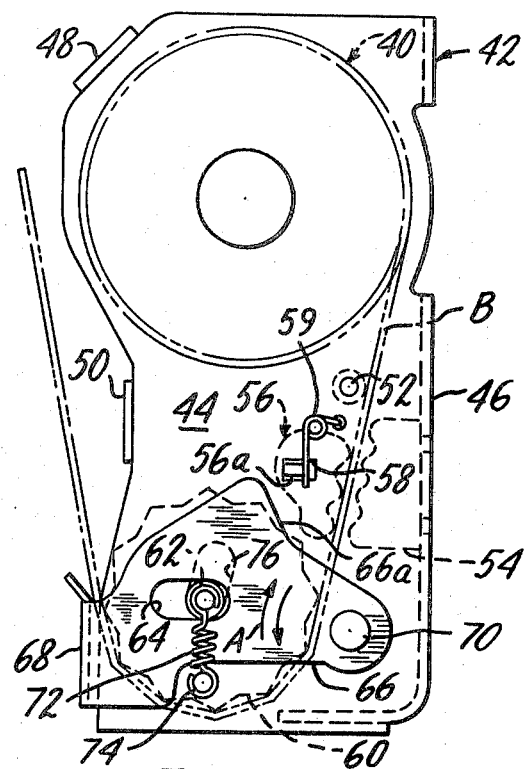
FIG. 2 is a side-elevational view of one embodiment of the invention, showing the belt clamp in the retracted, inactive condition.
Figure 3:
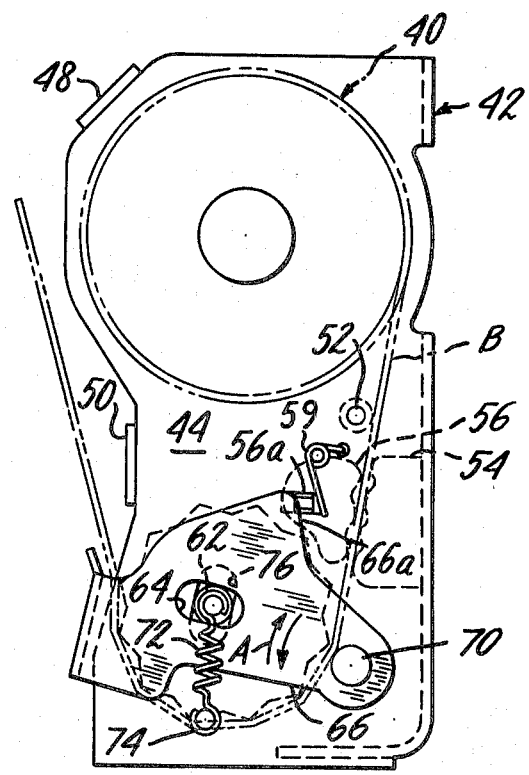
FIG. 3 is a side-elevational view of the embodiment of FIG. 2 in which the belt clamp is in the active, clamping configuration.

In the embodiment shown in FIGS. 2 and 3, the retractor 40 is mounted in a generally U-shaped frame 42 composed of a pair of transversely spaced-apart side members (only one shown, as designated by the reference numeral 44) and a base member 46. Stiffener plates 48 and 50 extend across the space between the free ends of the side members.

The belt B leads generally downwardly from the retractor reel past a guide roller 52 and through a space between a fixed clamping jaw 54 that is suitably affixed to the base 46 of the frame and a movable clamping jaw 56 that is mounted by means of laterally outwardly extending lugs 56a received in corresponding elongated slots 58 in the side members of the frame for movement between a retracted position (FIG. 2) in which the movable jaw is separated some distance from the fixed jaw 54 to allow the belt to pass freely through the gap between the jaws and a clamping position (FIG. 3) in which the belt is gripped between complementary, corrugated gripping surfaces on the respective jaws. A spring 59 on each side of the retractor engages the corresponding lug 56a and urges the movable jaw 56 into the retracted position.

After passing through the space between the jaws, the belt leads onto a corrugated turning roll 60. It makes nearly a complete U turn around the turning roll so that it leads off the turning roll in an generally upward direction. The shaft 62 of the turning roll 60 extends laterally outwardly from each end of the roll and into an elongated hole 64 in each of a pair of levers 66 located on either side of the frame 42 and rigidly interconnected by a cross piece 68. Preferably, the lever is a unitary U-shaped member formed by stamping and bending a metal plate of appropriate strength. The U-shaped lever is mounted for rotation in the side frame members by a shaft 70 having an axis transverse to the side members and parallel to the axis of a belt reel of the retractor. The levers 66 and the turning roll 60 together constitute a clamp-actuating mechanism that is normally held in a retracted position (FIG. 2) by a pair of springs 72 fastened between the shaft 62 of the turning roll and pins 74 on the side members of the frame. The levers 66 are located outside of the respective side members, and the shaft 62 of the turning roll extends out from either end of the roll through an elongated guide hole 76 in each side member. Each guide hole 76 extends generally parallel to the path of the incoming segment of the belt as it leads from the guide roller 52 to the turning roll 60, and the guide holes 64 in the levers 66 lie generally transverse to the guide holes 76 in the frame side members.

During normal pulling out and retracting motions of the belt, the forces of the springs 72 are sufficient to resist the force of the belt and hold the turning roll in the retracted position. When the retractor 40 locks in the event of a collision, upset, sudden stop or other emergency and a force is exerted in the pull-out direction of the belt B sufficient to overcome forces of the springs 72, the clamp actuating mechanism will pivot in the direction indicated by the arrow A about the shaft 70. After a relatively small pivotal movement, cam surfaces 66a on the levers 66 engage the lugs 56a on either end of the movable clamping jaw 56, and upon additional pivotal motion the mechanism urges the movable clamping jaw against the force of the springs 59 into engagement with the belt and ultimately clamps the belt between the corrugated gripping surfaces of the movable jaw 56 and the fixed jaw 54. Such engagement produces a high frictional force that clamps the belt B against any unwinding from the retractor. The magnitude of the frictional gripping force on the belt increases proportionately to the magnitude of the force tending to pull the belt from the belt clamp.

Upon release of the pull-out force on the belt the springs 72 shift the clamp actuating mechanism to the retracted position shown in FIG. 2, and the springs 59 push the movable jaw 56 back into the retracted position. In operation of the mechanism, the rigid connection between the levers 66 insures that the turning roll 60 will translate along a prescribed path without any significant cocking, thereby maintaining a substantially uniform force across the width of the clamping jaws, even though the belt may be pulled out along the direction that is oblique to a plane perpendicular to the axis of the retractor reel and the shaft 70.

Figures 4, 5, 6:
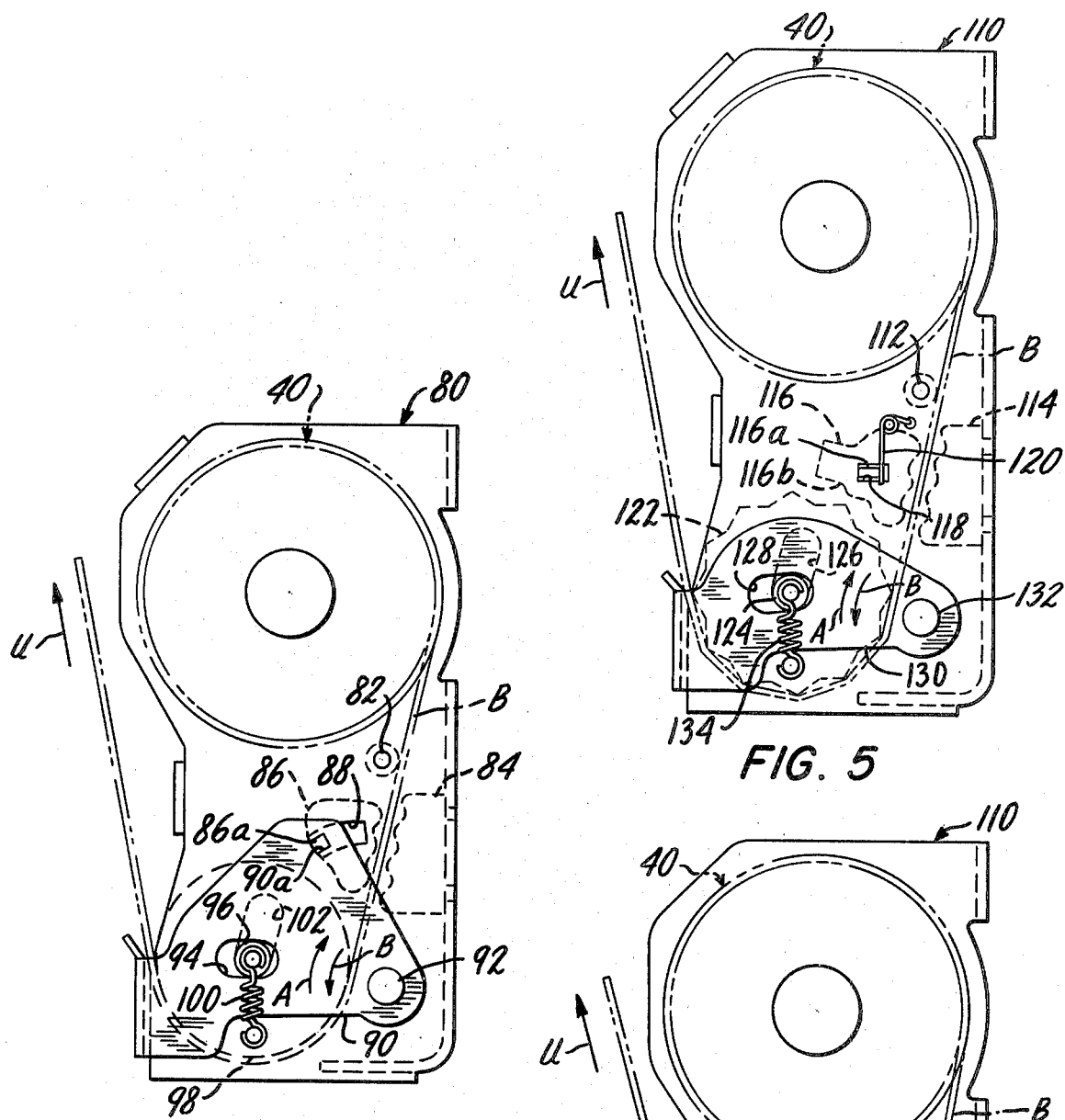
FIG. 4 is a side-elevational view of a second embodiment of the present invention showing the belt clamp in a retracted condition.
FIG. 5 is a side-elevational view of a third embodiment of the invention, showing it in the retracted condition.
FIG. 6 is a side elevational view of the embodiment of FIG. 5 in the belt-clamping condition.

The embodiment of the invention shown in FIG. 4 comprises a U-shaped frame 80 carrying an emergency locking retractor 40. The belt runs generally downwardly from the retractor past a guide roller 82 and between a fixed jaw 84 and a movable jaw 86. The movable jaw 86 has a pair of laterally outwardly extending lugs 86a that extend out through elongated holes 88 in the respective side members and are coupled to a U-shaped lever 90 by reception in holes 90a. The U-shaped lever 90 is pivoted about an axle 92 and has slots 94 in each lever arm that receive the shaft 96 of a belt turning roll 98. Springs 100 urge the lever 90 in a counter-clockwise direction (indicated by the letter B) and normally hold the clamp-actuating mechanism (the lever 90 and the turning roll 98) in an inactive condition in which the movable clamping jaw 86 is held away from the fixed clamping jaw 84 and enables the belt to pass freely through the space between the gripping surfaces of the jaws. The shaft 96 of the turning roll 98 extends out through the elongated holes 102 in the respective side members of the frame.

The embodiment shown in FIG. 4 operates in much the same way as the embodiment shown in FIGS. 2 and 3. In the absence of a relatively high force on the belt sufficient to overcome the forces of the springs 100, the belt can be pulled out freely from the retractor 40. In an emergency, such as a collision or sudden stop, that causes the emergency locking retractor 40 to lock and produces a relatively high force on the belt B in the pull out direction indicated by the arrow U, the clamp-actuating mechanism pivots clockwise in the direction indicated by the arrow A, thereby pushing the movable clamping jaw 86 toward the fixed clamping jaw by transferring forces from the lever 90 to each of the lugs 86a of the movable clamping jaw. The belt is thereupon frictionally gripped and prevented from pulling off the reel. When the high force in the pull out direction on the belt B ceases, the springs 100 release the clamp, which thereupon returns to the position illustrated in FIG. 4.

The embodiment shown in FIG. 5 comprises a U-shaped frame 110 carrying the emergency locking retractor 40 from which the belt B runs off generally downwardly past a guide roller 112 and then between a fixed clamping jaw 114 and a movable clamping jaw 116 that is mounted for movement toward and away from the fixed clamping jaw by means of lugs 116a that extend out through elongated slots 118 and in each of the side members of the frame. A spring 120 urges the movable clamping jaw 116 in a direction away from the fixed clamping jaw 114.

The belt then makes a U turn around a turning roll 122, the shaft 124 which extends outwardly in both directions through elongated slots 126 in the side members of the frame. Each end of the shaft is carried by an elongated slot 128 in each of the arms of a generally U-shaped lever 130 that is mounted to pivot in the side frames by an axle 132. Springs 134 on each side of the frame hold the lever 130 in a counterclockwise direction indicated by the arrowed line B but yield upon the imposition of a relatively high force on the belt in the pull-out direction U. When the emergency locking retractor 40 is locked and a high force is imposed on the belt B, the clamp-actuating mechanism (the turning roll 122 and the lever 130) pivots clockwise (the direction A) about the axis of the axle 132, thereby engaging the corrugated surface of the turning roll 122 with a correspondingly corrugated camming surface 116b on the movable clamping jaw 116. The camming action of the turning roll on the movable clamping jaw forces the movable clamping jaw toward the fixed clamping jaw 114, thereby frictionally engaging the belt and preventing it from being pulled off the reel.

At such time as the high force on the belt in the pull-out direction ceases, the springs 134 pull the clamp-actuating mechanism counter clockwise, thereby releasing the movable clamping jaw, which is pushed away from the fixed clamping jaw by the springs 120.

The retractor and belt clamp assembly shown in FIGS. 7 to 11 comprises a U-shaped frame 140 that carries the emergency locking retractor 40 in the upper portion and the belt clamping mechanism in the lower portion. The belt B leads generally downwardly from the retractor past a belt turning roll 142 that establishes a predetermined path of the belt between a fixed clamping jaw 144 and a movable clamping jaw 146, regardless of a number of turns of the belt on the belt reel of the retractor 40. Lugs 146a extend out from either side of the movable clamping jaw into elongated holes 148 in each of the side members of the frame, thereby enabling the movable clamping jaw 146 to translate along the holes 148 towards the fixed clamping jaw when a force is imposed upon the movable clamping jaw sufficient to overcome the force of the springs 150 that normally hold the moving clamping jaw away from the fixed clamping jaw and allow the belt to pass freely between the gripping surfaces of the jaws.

The belt turns around a turning roll 152 and leads upwardly in a direction generally opposite to the direction in which it approaches the turning roll. The shaft 154 of the turning roll 152 extends outwardly in both directions through mounting holes in each arm of a U-shaped lever 156 that is supported in the side frame members for pivotal movement by an axle 158. The U-shaped lever 156 is mounted inwardly of the side frame members and differs in this respect from the embodiments described above. The end portions of the shaft 154 extend out through elongated holes 160 in the side members of the frame, and a spring 162 urges the lever in a counter clockwise direction about the axle 158, thereby normally retaining the clamping-actuating mechanism in an inactive condition out of engagement with the movable clamping jaw 146.

In an emergency which produces locking of the emergency locking retractor 40 and a relatively high force in the pull-out direction on the belt B, the force of the springs 162 is overcome, and the clamp actuating mechanism pivots clockwise about the axle 158, thereby engaging the corrugated surface of the turning roll 152 with a camming surface 146b on the movable clamping jaw. The movable clamping jaw is pushed toward the fixed clamping jaw, thereby frictionally engaging the belt between the corrugated gripping surfaces of the respective jaws, as shown in FIG. 9. The clamping mechanism automatically returns to the belt-releasing position shown in FIG. 7 when the high pull-out force on belt B ceases.

As shown in FIG. 8, it is advantageous to provide guides along each side of the frame 140 to ensure that the belt B tracks the turning roll 152, even though it might be pulled out from the retractor-belt clamp assembly in a direction oblique to the axis of the turning roll. Each side member of the frame 140 has an outwardly extending flange 140a along the lower portion of the free end, and a generally J-shaped guide member 163 is fastened, such as by rivets 164, to each of the flanges 140a. Alternatively, as shown in FIG. 11, each side wall of the frame 140' may have a generally C-shaped flange 140a' interposed along the path of the belt as it leads upwardly and outwardly from the turning roll. Each guide element 163 or C-shaped flange 140a presents a smooth guiding surface for the portion of the belt that runs out from the turning roll.

In each of the embodiments described above and shown in the accompanying drawings, the elongated holes in the side members of the frame that receive the lugs on the movable clamping jaw may be of a size and position such as to restrict the movement of the movable clamping jaw toward the fixed clamping jaw, thereby insuring that an excessive clamping force is not applied to the belt. This concept is illustrated in FIG. 10 of the drawings, in which the minimum distance indicated by the dimension line labeled X is controlled by the position of the end 148a of each elongated hole 148, thereby maintaining the desired clearance between movable clamping jaw 146 and the fixed clamping jaw 144. Generally the minimum clearance X between the movable clamping jaw and the fixed clamping jaw will be just slightly less than the thickness of the belt.

Thus, the present invention provides a belt clamp that is of relatively simple construction, small size, light weight and that can readily be assembled as a subassembly of a single unit with an emergency locking retractor. The belt clamp eliminates the problem of excessive pull out of the belt, even though the retractor belt reel is locked, by clamping the belt so that the turns of the belt that remain loosely wound on the belt reel are not tightened. The substantial elimination of unwanted extension of the belt enhances the safety of the vehicle occupant.

The above-described embodiments of the invention are intended to be merely exemplary, and numerous variations and modifications of those embodiments will be readily apparent to those skilled in the art without departing from the spirit and scope of the invention. All such variations and modifications are intended to be included within the scope of the invention as defined in the appended claims.

I claim:

1. A belt clamp for use in conjunction with an emergency locking retractor in a vehicle occupant restraint belt system comprising a U-shaped frame having a pair of side members, a pair of spaced-apart levers, one on either side of the frame, substantially rigidly joined together and mounted on the frame for rotation about an axis transverse to the side members, a belt turning roll having the belt looped around it and having a shaft carried by the lever arms for rotation about an axis spaced apart from and parallel to the axis of rotation of the levers, the turning roll and levers constituting a clamp-actuating structure, matching elongated guide holes in the side members receiving the respective end portions of the shaft, a fixed clamping jaw affixed to the frame on one side of and closely adjacent to the path of the belt as it leads toward the turning roll, a movable clamping jaw located on the other side of the path of the belt and mounted on the frame for movement toward and away from the fixed clamping jaw, and at least one spring urging the turning roll in a direction opposed to the pull-out direction of the belt from the turning roll, the turning roll, levers and clamping members being located on the frame such that upon locking of the retractor and upon imposition of a pull-out force on the belt above a selected level, the clamp-actuating structure translates into engagement with the movable clamping jaw and moves it toward the fixed clamping jaw, thereby to clamp the belt between the jaws against pulling out from the retractor.

2. A belt clamp according to claim 1 wherein a surface on the turning roll is engageable with a cam surface on the movable clamping jaw to transmit force to the movable jaw to move it toward the fixed jaw.

3. A belt clamp according to claim 1 wherein a cam surface on each of the levers is engageable with a portion of the movable clamping jaw to transmit force to the movable jaw to move it toward the fixed jaw.

4. A belt clamp according to claim 2 wherein the turning roll has a corrugated surface, and the cam surface on the movable clamping jaw that is engaged by the turning roll is correspondingly corrugated, thereby to enhance the transmission of force from the turning roll to the movable jaw.

5. A belt clamp according to claim 1 wherein the shaft of the turning roll is received in matching elongated holes in the levers, said holes being transverse to the guide holes in the side members.

6. A belt clamp according to claim 1 and further comprising at least one spring urging the movable clamping jaw in a direction away from the fixed clamping jaw.

7. A belt clamp according to claim 3 wherein the movable jaw is mounted in the side members by means of laterally outwardly projecting lugs that extend into elongated holes in the side members.

8. A belt clamp according to claim 7 wherein each lug in the jaw is received in a hole in the corresponding lever, whereby motion of the levers imparts motion to the movable jaw through transfer of forces from the lever holes to the lugs.

9. A belt clamp according to claim 2 wherein the movable clamping jaw has a pair of lugs extending laterally outwardly and received in elongated holes in the side members, the sizes and locations of the lugs and holes being such as to limit the extent of movement of the movable jaw toward the fixed jaw and prevent excessive clamping forces from being imposed on the belt between the jaws.

10. A belt clamp according to claim 1 or claim 2 wherein the levers are joined together by a cross-piece.

11. A belt clamp according to claim 10 wherein the cross-piece is an integral part of the levers, the levers and cross-piece constituting a unitary, generally U-shaped element.

12. A belt clamp according to claim 1 and further comprising guide surfaces on the side members of the frame located along the path of the belt as it leads from the turning roll and engageable with the sides of the belt to keep it from running off either side of the turning roll.

* * * * *